Figure 1:
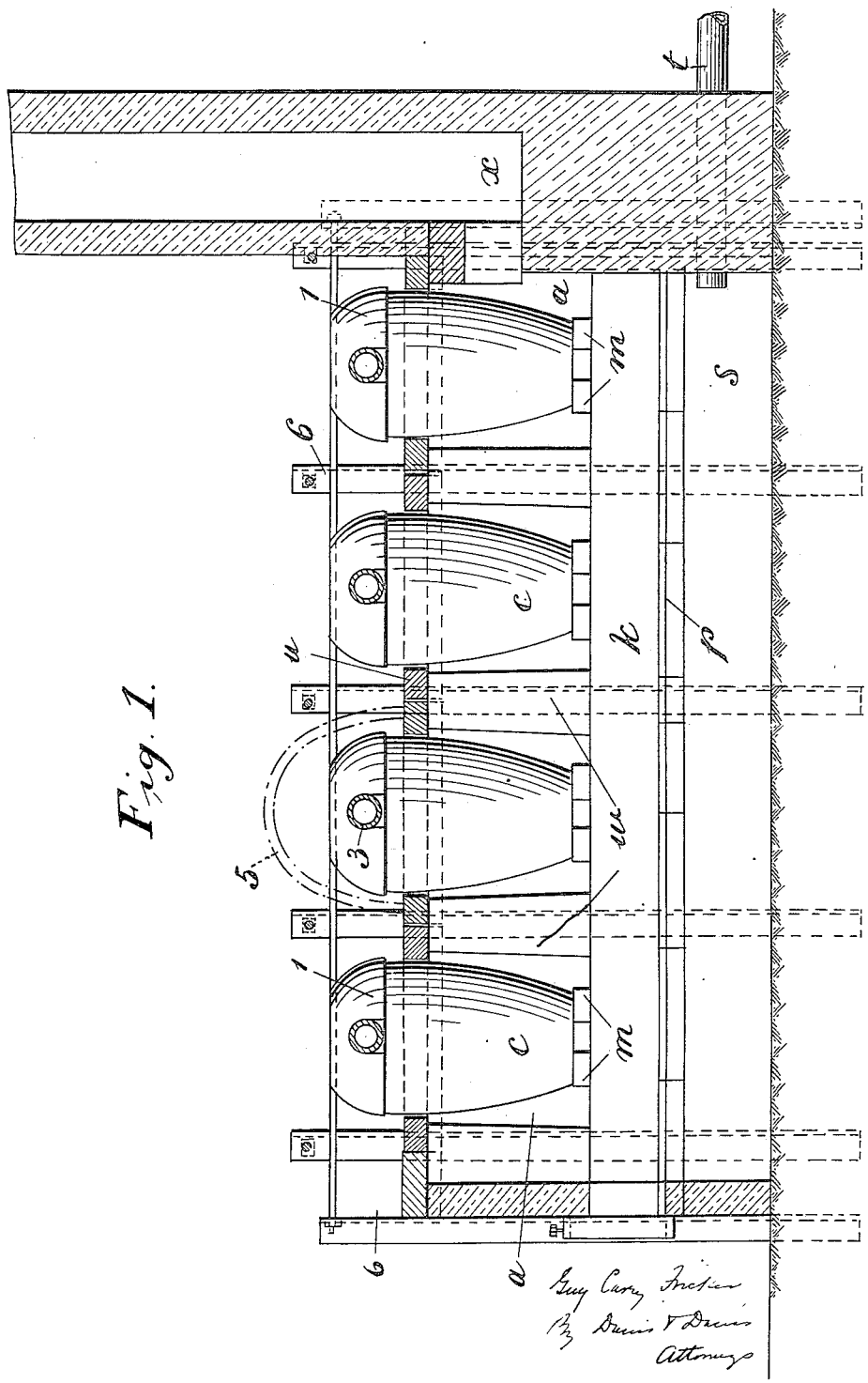

G. C. FRICKER.
REFINING OF ZINC.
APPLICATION FILED JAN. 27, 1917.

1,287,949.

Patented Dec. 17, 1918.
3 SHEETS—SHEET 1.

G. C. FRICKER.
REFINING OF ZINC.
APPLICATION FILED JAN. 27, 1917.
1,287,949.
Patented Dec. 17, 1918.
3 SHEETS—SHEET 3.
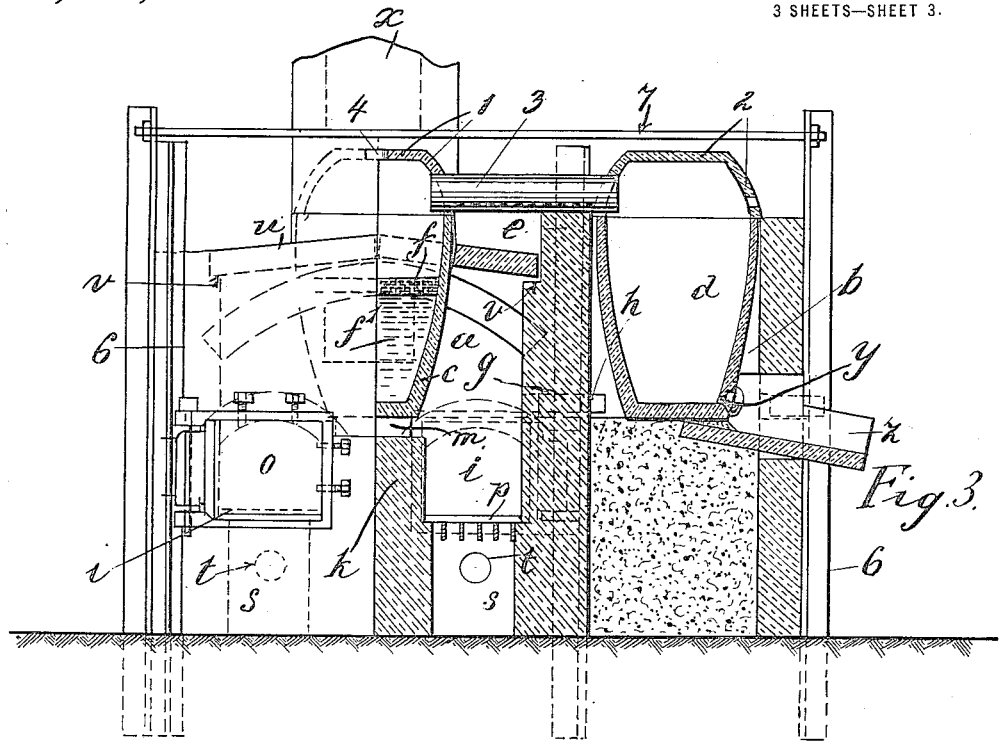
Fig. 3.
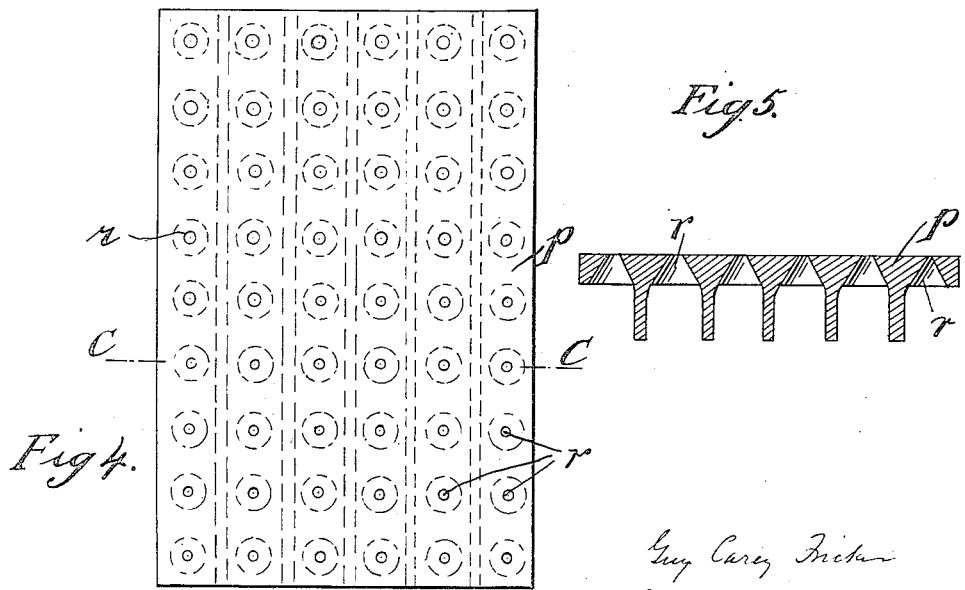
Fig. 4.
Fig. 5.

UNITED STATES PATENT OFFICE.

GUY CAREY FRICKER, OF LUTON, ENGLAND.

REFINING OF ZINC.

1,287,949.　　　　　Specification of Letters Patent.　　Patented Dec. 17, 1918.

Application filed January 27, 1917. Serial No. 144,976.

*To all whom it may concern:*

Be it known that I, GUY CAREY FRICKER, a subject of the King of Great Britain and Ireland, residing at Luton, in the county of Bedford, England, have invented Improvements in or Relating to the Refining of Zinc, of which the following is a specification.

This invention has reference to improvements in the refining of zinc by the distillation method whereby high grade zinc can be produced from inferior grades of zinc. It also has reference to improvements in zinc distillation and condensing plant suitable for carrying out the improved method of refining zinc.

According thereto for obtaining high grade zinc from impure grades of zinc, the zinc vapor that is being distilled off from a melted charge of impure zinc is caused to pass through a filter composed of inert refractory material composed for example of dry foundry coke or other equivalent porous or absorbent material that will act to absorb and retain impurities mixed with the zinc vapor, so that the zinc vapor passing from the filter will be in a purified condition. The filtering material may be broken up into pieces of about one cubic inch capacity and shoveled on to the top of the charge of molten impure zinc in a crucible or other vessel so as to form thereon a floating layer of say about three inches in thickness, the crucible being made sufficiently deep for the purpose. The filter is removed after the treatment of each charge. The impure metal left at the bottom of the crucible can be removed at intervals, say about once a week, or once a fortnight in the case of a crucible adapted to contain a charge of about five hundredweight.

In order to admit of the distilled zinc being condensed in an advantageous manner and so that the production of blue powder zinc, which is undesirable, shall be diminished as far as possible, the condensing vessel, or each such vessel, preferably in the form of a crucible, is maintained at a temperature a little above the melting point of the zinc so that the zinc can be collected in the liquid state and run off into molds. For thus heating the condensing crucible, the chamber therefor may be separated from the heating chamber containing the distilling crucible by a wall having a connecting opening through which hot gases can pass from the latter to the former chamber under the control of a closing device.

The accompanying illustrative drawings show distilling and condensing plant according to the invention and suitable for carrying out the zinc refining method above described.

Figure 2:
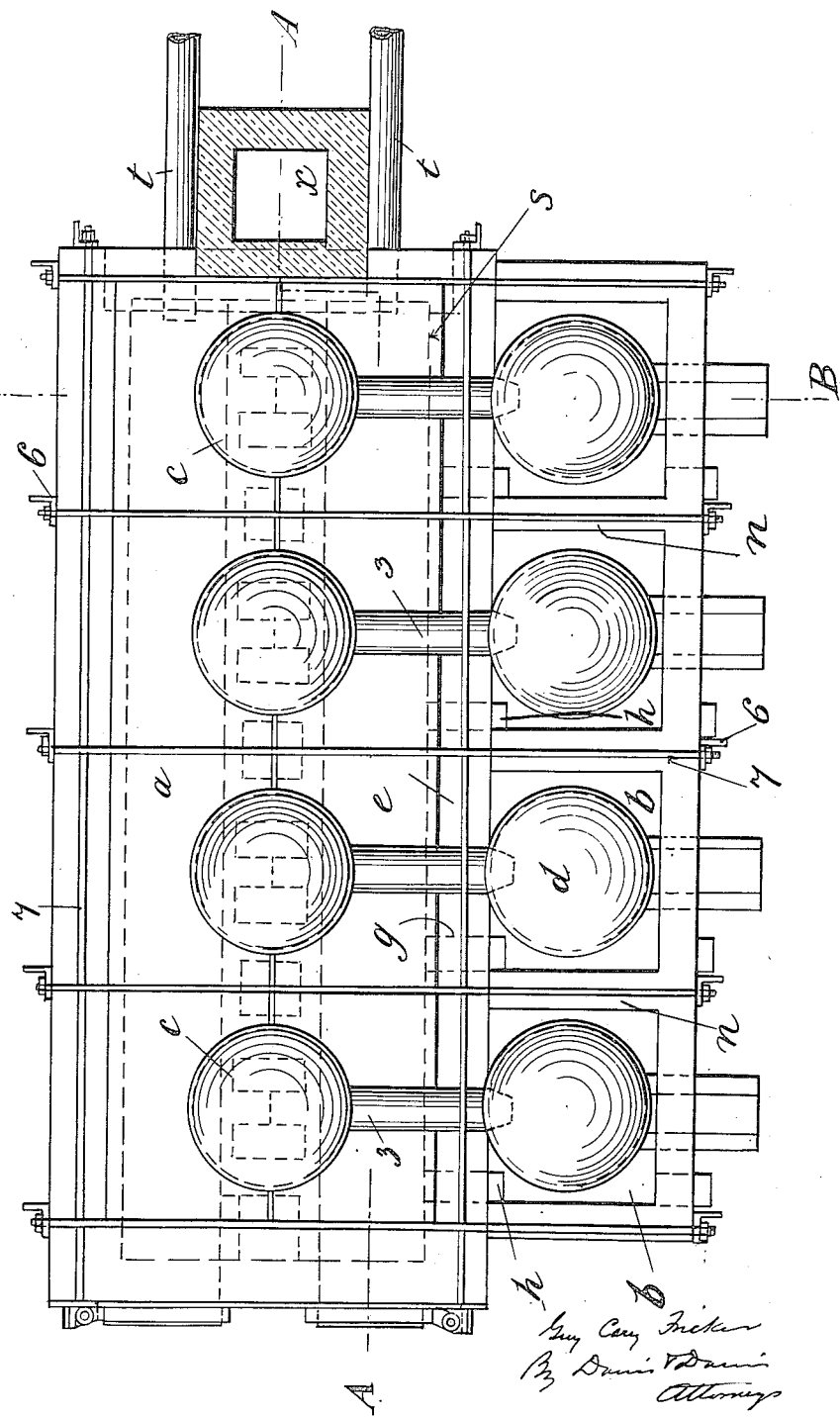

In the drawings, Figure 1 is a vertical section on the line A A of Fig. 2 and Fig. 2 a plan of the said plant. Fig. 3 shows the plant partly in front end elevation and partly in cross section on the line B B of Fig. 2. Fig. 4 is a plan of a fire grate and Fig. 5 is a cross section thereof on the line C C of Fig. 4.

In the example shown the plant comprises a heating and distilling chamber $a$ and a cooling or condensing chamber $b$ arranged side by side to contain the distilling and condensing crucibles $c$ and $d$ respectively and separated from each other by a vertical wall $e$.

$f$ (Fig. 3) shows the thick layer of porous filtering material such as hereinbefore referred to arranged above and so as to float on and completely cover the molten charge $f^1$ of unrefined zinc in one of the crucibles. The vertical wall $e$ is provided at or near the floor of the cooling or condensing chamber $b$ with one or more horizontal connecting passages $g$ adapted to be closed to a greater or less extent by one or more bricks $h$ for controlling the passage of hot gases from the heating and distilling chamber (hereinafter called the distilling chamber) to the cooling or condensing chamber (hereinafter called the condensing compartment). The distilling chamber $a$ is constructed with two fire boxes $i$ separated by a vertical dividing wall $k$. This wall is adapted to support, preferably by a couple of laterally spaced bricks $m$ of refractory material, one or more distilling crucibles $a$, preferably several. In the following description it will be assumed that there are several distilling crucibles $a$ and an equal number of condensing crucibles $b$. In this case the condensing chamber is preferably subdivided, as shown, by transverse walls $n$ into a number of independent condensing chambers $b$ each containing a condensing crucible $d$. Each fire box $i$ is provided with a fire door o and with a hearth preferably consisting of a cast iron plate p formed with a number of conical openings r therethrough, (Figs. 4 and 5) the smaller ends of the holes being at the top. This facilitates the removal of clinker. The ash pit s below each grate is closed and provided with a pipe t for the admission of air under pressure. The distilling chamber a is covered by a roof u of refractory material made in parts that surround the upper portions of the distilling crucibles c and are supported by ledges v on the side walls of the heating chamber a and by central vertical supports or pillars w carried by the wall k, these supports or pillars being so arranged, as shown, as to admit of flame and hot gases from the fire boxes i passing freely around the crucibles c. The rear end of the distilling chamber a communicates with a chimney or flue x. The condensing chambers b have their floors preferably at a level corresponding substantially with the upper surfaces of the supporting bricks m for the distilling crucibles a and upon them rest the condensing crucibles d which are preferably similar to the distilling crucibles a except that each of them is provided at the bottom with a tapping hole y normally stopped by loam or red sand, a gutter z being placed below each tapping hole. The distilling crucibles c are preferably ordinary plumbago crucibles. The condensing crucibles d may be of similar material, or of clay, or consist of clay lined iron vessels. Both sets of crucibles are provided with covers 1 and 2 respectively that are luted in place and connected together in pairs by pipes or tubes 3 of clay, plumbago or equivalent material that will not affect the purity of the zinc vapor passing through them. The covers 1 of the distilling crucibles c are each provided with an aperture 4 at the top that is closed only after gaseous products from the heated filter f floating on the molten charge of impure zinc in the crucible, and any air initially contained in the crucible have been discharged. This point is readily determined by escaping zinc vapor burning freely at the aperture with its characteristic flame. When this occurs, the aperture is stopped by a plug of clay.

The crucibles c and d may each be covered by a hood, as indicated in dotted lines at 5 in Fig. 1, that is adapted to retard loss of heat from the top thereof.

The side and end walls of the distilling and condensing chambers are supported by external pillars 6 and tie rods 7 in the usual manner.

What I claim is:—

1. The method of obtaining high grade zinc from an impure grade of zinc which consists in causing the zinc vapor produced by heating a charge of impure zinc to pass through a filter of inert material, arranged above, floating upon and completely covering the molten charge of impure zinc so that the zinc vapor is constrained to pass upward wholly through said filter and condensing the resulting purified zinc vapor.

2. The method of obtaining high grade zinc from an impure grade of zinc which consists in causing the zinc vapor produced by heating a charge of impure zinc to pass through a filter composed of a layer of pieces of refractory porous or absorbent material floating upon and completely covering the molten charge of impure zinc, so that the zinc vapor is constrained to pass upward wholly through said filter, and condensing the resulting purified zinc vapor.

3. The method of obtaining high grade zinc from an impure grade of zinc which consists in causing the zinc vapor produced by heating a charge of impure zinc to pass through a filter composed of pieces of coke arranged to form a thick layer floating upon and completely covering the layer of impure molten zinc so that the zinc vapor is constrained to pass upward wholly through said filter and condensing the resulting zinc vapor.

4. The herein described method of obtaining high grade zinc from an impure grade of zinc which consists in placing a charge of the impure zinc in a distilling vessel, completely covering it with a thick layer of pieces of inert refractory material of a porous or absorbent nature that rest upon the charge of impure zinc, heating the charge of zinc to the volatilizing temperature so that the resulting zinc vapor is constrained to pass through the filter floating on the molten charge, while impurities present in the zinc vapor rising from the charge will be removed therefrom and retained by the filter, and condensing the zinc vapor leaving the filter.

5. The method of obtaining high grade zinc from an impure grade of zinc which consists in causing the zinc vapor produced by heating a charge of impure zinc to pass through a filter of inert material arranged above, floating upon and completely covering the molten charge of impure zinc and condensing the resulting purified zinc vapor at a temperature slightly above the melting point of the purified zinc.

6. In zinc distilling and condensing plant, a distilling chamber provided at its lower part with laterally arranged fire boxes having between them a division wall and at one end with an outlet for hot gases, a longitudinal row of distilling vessels carried by said division wall, vertical supports carried by said division wall between the distilling vessels and a roof of refractory material made in pieces carried partly by the side walls of the distilling chamber and partly by the vertical supports and adapted to surround the upper portions of the distilling vessels.

7. Zinc distilling and condensing plant comprising separate distilling and condensing vessels, a heating chamber for said distilling vessel, connecting means for zinc vapor between the distilling and condensing vessels and means whereby hot gases from the heating chamber can be utilized to heat the condensing vessel.

Signed at 75/77 Cornhill, in the city of London, England, this fifth day of January, 1917.

GUY CAREY FRICKER.

Witnesses:
J. M. DE DE LOS NIOS,
WM. O. BRAEDEO.